(12) United States Patent
Ray

(10) Patent No.: US 11,764,857 B2
(45) Date of Patent: Sep. 19, 2023

(54) SYSTEMS AND METHODS FOR MULTIPLE SIGNAL RECEPTION USING RECEIVER DIVERSITY

(71) Applicant: The Boeing Company, Chicago, IL (US)

(72) Inventor: Gary A. Ray, Issaquah, WA (US)

(73) Assignee: The Boeing Company, Arlington, VA (US)

(*) Notice: Subject to any disclaimer, the term of this patent is extended or adjusted under 35 U.S.C. 154(b) by 148 days.

(21) Appl. No.: 17/467,036

(22) Filed: Sep. 3, 2021

(65) Prior Publication Data

US 2022/0271826 A1 Aug. 25, 2022

Related U.S. Application Data

(60) Provisional application No. 63/153,912, filed on Feb. 25, 2021.

(51) Int. Cl.
*H04B 7/08* (2006.01)

(52) U.S. Cl.
CPC ........... *H04B 7/0888* (2013.01); *H04B 7/088* (2013.01)

(58) Field of Classification Search
CPC .... H04B 7/0888; H04B 7/088; H04B 7/0837; H04L 25/03891
USPC ........................................................ 375/347
See application file for complete search history.

(56) References Cited

U.S. PATENT DOCUMENTS

| | | | |
|---|---|---|---|
| 6,714,774 B1* | 3/2004 | Nafie | H04B 7/0837 375/348 |
| 8,843,313 B2 | 9/2014 | Enge et al. | |
| 9,020,074 B2 | 4/2015 | Adler et al. | |
| 9,401,826 B2 | 7/2016 | Eitel et al. | |
| 10,536,200 B2 | 1/2020 | Erez et al. | |
| 2005/0053123 A1* | 3/2005 | Higuchi | H04B 7/088 375/148 |
| 2013/0215945 A1* | 8/2013 | Eitel | H04L 25/025 375/343 |
| 2013/0244665 A1* | 9/2013 | Clevorn | H04W 52/0245 455/226.1 |
| 2016/0142125 A1* | 5/2016 | Elmakias | H04B 7/0837 375/340 |
| 2018/0299531 A1* | 10/2018 | Hiscock | G01S 3/465 |
| 2021/0021332 A1* | 1/2021 | Eitel | H04B 7/0857 |

* cited by examiner

*Primary Examiner* — Syed Haider
(74) *Attorney, Agent, or Firm* — Ostrager Chong Flaherty & Broitman P.C.

(57) ABSTRACT

Methods for improving multiple signal reception using receiver diversity in the context of a wideband radar and communications receiver. The method allows for improved signal reception as well as improved angle of arrival estimation. A first approach uses a method that improves angle of arrival estimation while using the standard diversity technique of selection combining. A second approach uses a method of equalization of the signal rather than equalization of the channel to both improve the signal SNR over standard selection combining and further improve the angle of arrival estimate over the first approach.

19 Claims, 7 Drawing Sheets

SYSTEMS AND METHODS FOR MULTIPLE SIGNAL RECEPTION USING RECEIVER DIVERSITY

RELATED PATENT APPLICATION

This application claims the benefit, under Title 35, United States Code, Section 119(e), of U.S. Provisional Application No. 63/153,912 filed on Feb. 25, 2021.

BACKGROUND

The technology disclosed herein generally relates to wideband radar and communications receivers and, in particular, relates to wideband receivers that employ antenna diversity.

In wireless communications, diversity methods are used to mitigate the detrimental effects of channel variation (fading). In particular, the diversity method known as receive antenna diversity (hereinafter "receiver diversity") involves the use of multiple receive antennas connected to respective receivers. Each antenna acts as a separate branch receiving the transmitted signal multiplied by a respective fading coefficient. Diversity reduces the probability that the received signal is adversely affected by fading on all branches simultaneously.

Receiver diversity is typically exploited using MIMO (multiple-input multiple-output) techniques in the communications realm where the transmitter and receiver are cooperatively transmitting and receiving a known communications signal such as with a base station and cell phone. However, when the context is a non-cooperative receiver of multiple signals across a wide spectrum and where angle of arrival (AOA) is a critical piece of information about each reception, standard MIMO techniques are either less effective or impossible.

In the case of single-antenna reception, signal fading is a serious reception problem, especially for weak and distant signals. Adding more antennas and using receiver diversity techniques such as those used in SIMO (single-input multiple-output) communications systems is one way to address the problem. However, of the three main approaches to SIMO (selection combining, maximal ratio combining, and equal gain combining), only selection combining is able to preserve angle of arrival information.

SUMMARY

The signal processing techniques disclosed herein provide a way to improve signal reception using receiver diversity in the context of a wideband radar and communications receiver. In particular, the technology described in detail below includes methods for signal equalization using optimization to overcome the problems with existing multichannel equalization approaches. The proposed methods allow for improved signal reception as well as improved angle of arrival estimation. A first approach uses a method that improves angle of arrival estimation while using the standard diversity technique of selection combining A second approach uses a method of equalization of the signal rather than equalization of the channel to both improve the signal SNR over standard selection combining and further improve the angle of arrival estimate over the first approach.

The methods proposed herein are not only effective in combating the effects of signal fading from the environment due to signal propagation, but can also mitigate the effects of signal filtering differences across the set of multiple receivers for each antenna. This leads to both better signal fidelity and signal descriptions (such as produced by pulse descriptor words) as well as better signal location estimates.

Although systems and methods for multiple signal reception using receiver diversity will be described in some detail below, one or more of those embodiments may be characterized by one or more of the following aspects.

One aspect of the subject matter disclosed in some detail below is a method for multiple signal reception using receiver diversity, the method comprising: (a) receiving respective received signals in a plurality of receivers following transmission of an original signal by a source; (b) calculating an estimate of the original signal using selection combining of the received signals; and (c) calculating an estimate of an angle of arrival of the original signal using the estimate of the original signal.

Another aspect of the subject matter disclosed in some detail below is a system for multiple signal reception using receiver diversity, the system comprising: a plurality of antennas configured to transduce an original signal transmitted as radiation by a source into analog electrical signals; a plurality of receivers respectively connected to receive analog electrical signals from the plurality of antennas and configured to convert the analog electrical signals to digital electrical signals; and a diversity processor connected to receive digital electrical signals from the plurality of receivers and configured to perform operations comprising: (a) calculating an estimate of an original signal using selection combining of the digital electrical signals; and (b) calculating an estimate of an angle of arrival of the original signal using the estimate of the original signal.

A further aspect of the subject matter disclosed in some detail below is a method for multiple signal reception using receiver diversity, the method comprising: (a) receiving respective received signals in a plurality of receivers following transmission of an original signal by a source; (b) calculating an initial estimate of the original signal using selection combining of the received signals; (c) calculating an optimized estimate of the original signal using rules of a minimization algorithm and the initial estimate of the original signal; and (d) calculating an estimate of an angle of arrival of the original signal using the optimized estimate of the original signal.

Yet another aspect is a system for multiple signal reception using receiver diversity, the system comprising: a plurality of antennas configured to transduce an original signal transmitted as radiation by a source into analog electrical signals; a plurality of receivers respectively connected to receive analog electrical signals from the plurality of antennas and configured to convert the analog electrical signals to digital electrical signals; and a diversity processor connected to receive digital electrical signals from the plurality of receivers and configured to perform operations (a) through (d) set forth in the immediately preceding paragraph.

Other aspects of systems and methods for multiple signal reception using receiver diversity are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Figure 1:
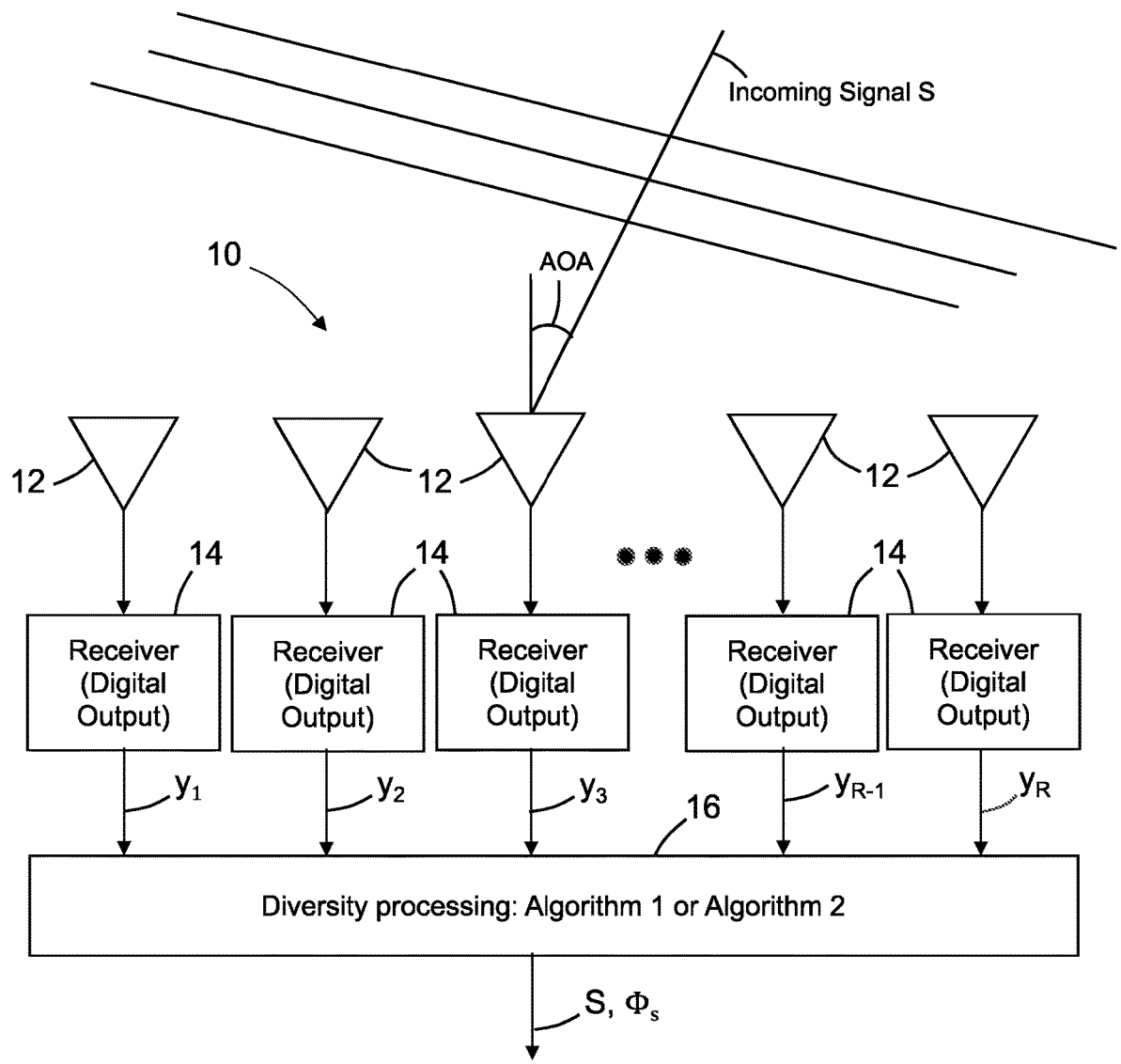
FIG. 1 is a block diagram identifying components of a system in which signals received by multiple receivers undergo diversity signal processing using selection combining to estimate the original signal and then using either of two optimization algorithms to estimate the angle of arrival of the original signal.

Illustrative embodiments of systems and methods for multiple signal reception using receiver diversity are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

There are typically two important usages of multiple antennas for signal reception. One is to form an array and use the array to create a receive beam in the direction of the signal in order to increase the receive gain. The other is to use the multiple antennas to create a diversity of received signals in order to deal with propagation effects such as signal fading. The latter approach is called receive antenna diversity or receiver diversity. Various algorithms associated with these multiple receptions exist in order to improve system performance. Standard diversity techniques are typically concerned with improving the SNR of the received fading signals through some form of signal combining across multiple antennas. However, these techniques are typically not concerned with measuring the signal angle of arrival or forming a beam. The methodology proposed herein achieves both signal SNR improvement and angle of arrival estimation. The mathematical model is as follows.

Given a set of R receive antennas and a signal s, channel fading may be represented (modeled) as R channel filters $\{h_i\}_{i=1}^R$ which are convolved with signal s, and Gaussian noise $n_i$ is added to produce R digitized signals at baseband $\{y_i\}_{i=1}^R$. These baseband signals are represented by complex values $\{Re(y_i)+jIm(y_i)\}$, where $j=\sqrt{-1}$. Thus, R signals may be modeled as $$y_i = s * h_i + n_i,$$

for the i-th channel, where i=1, 2, ..., R. Time is a further aspect included in the model. Each of the variables listed vary over time t and the equation becomes $$y_i(t-\Delta_i) = s(t) * h_i(t) + n_i(t)$$

Here the time delays $\{\Delta_i\}$ represent the different delays of the signal impinging on each antenna depending on the angle of arrival. Not only does the signal and noise vary with time, but so does the channel filter $h_i(t)$ as fading and multipath changes. (As used herein, the term "multipath" is the phenomenon wherein radio signals from the same source are received by the receiving antenna via two or more paths.) Also, this received signal $y_i$ is often sampled and thus t would be a uniformly spaced set of times $\{t_j\}$. With a linear equally spaced array of antennas, the delay difference between adjacent antennas is a constant $\Delta = \Delta_{i+1} - \Delta_i$ and estimating that constant is the means for estimating the signal angle of arrival since the angle of arrival is directly related through geometry to $\Delta$. In addition, if this delay difference is small compared to the signal wavelength, this can be approximated as a phase difference $\phi$, $0 \leq \phi \leq 2\pi$. Note that this phase difference could also change over time. This leads to the following reception model for i=1, 2, ..., R:

$$y_i = e^{(j(i\phi(t)))} s(t) * h_i(t) + n_i(t).$$

The techniques disclosed herein take as input the received signal set $\{y_i(t)\}_{i=1,2,...,R}$ and produce one estimated signal S(t) with improved SNR as well as a phase difference estimate $\Phi_S(t)$. This defines an angle of arrival estimate using the known array geometry.

To simulate the results of the algorithms being introduced, one may use some standard assumptions about the fading channels defined by $\{h_i(t)\}$. If the fading is flat, each channel filter $h_i$ is modeled as a single circularly symmetric complex Gaussian random variable, i.e., $h_i$ is a complex filter of length 1. Its magnitude is then a Rayleigh random variable, and this is called Rayleigh fading. Rayleigh fading is a statistical model for the effect of a propagation environment on a radio signal, such as that used by wireless devices. Rayleigh fading models assume that the magnitude of a signal that has passed through such a transmission medium (also called a communication channel) will vary randomly, or fade, according to a Rayleigh distribution. Rayleigh fading is a model appropriate for many reflections and no direct signal paths to the receiver. By contrast, for wideband receivers that cover long-range reception across a massive bandwidth, the flat fading model is not appropriate. Instead, the Rician fading model is used. The Rician fading model has a dominant line-of-sight path and one or more fading paths that are lower in amplitude.

Let $K_h$ be the FIR filter length used for the fading model and let F be the depth of fade (how low in amplitude the indirect paths are compared to the direct paths). One may model this as follows: $h_{i0}=r_i$ for all i, where $r_i=r_i(\sigma)$ are random variables of a Rayleigh distribution (with a being the scale parameter of the Rayleigh distribution) and $$h_{ik} = e^{ju_{ik}}\left(\frac{r_i}{F}\right)s_{ik}$$

where $s_{ik}=s_{ik}(\sigma)$ are Rayleigh random variables for k=1, . . . , $K_h$−1 and $u_{ik}$ are uniform random variables between 0 and 2π.

The conventional way to estimate S(t) typically uses one of three basic receiver diversity algorithms: (1) selection combining; (2) maximum ratio combining; and (3) equal gain combining A person skilled in the art may consult R. Janaswamy, Radiowave Propagation and Smart Antennas for Wireless Communications. Kluwer Academic Publishers, 2000, and L. C. Godara, Handbook of Antennas for Wireless Communications. CRC Press, 2002 about these MIMO/SIMO/diversity algorithms as used in wireless communications.

Maximum ratio combining and equal gain combining require knowledge of, or estimates of, the channels involved. When such signals are combined using either approach, relative phase and delay information between receive (antenna) channels is lost. The methods proposed herein focus on selection combining Two optimization algorithms (described below) can be used together with selection combining to both improve the signal reception in the presence of multipath and fading, as well as provide an angle of arrival estimate for the signal. The first optimization algorithm (hereinafter "Algorithm 1") is simpler and involves only minimal computation, while the second optimization algorithm (hereinafter "Algorithm 2") gives a much better result, but involves more sophisticated processing.

FIG. 1 is a block diagram identifying components of a system 10 in which signals are transduced by R antennas 12 into electrical signals which are then received by R receivers 14. Each receiver 14 includes a respective plurality of signal separation and tracking filters configured to filter signals in respective bandwidths. The received signals $y_i$ output by respective receivers 14 for each bandwidth undergo diversity processing by diversity processor 16. The diversity processor 16 uses selection combining to estimate the original incoming signal S and then uses either Algorithm 1 or Algorithm 2 to estimate ($\Phi_S$) the angle of arrival of the original signal.

As a result of receiving a signal, improving its fidelity, and estimating its angle of arrival, one can apply this process in many different ways. For examples, the multiple antennas and process disclosed herein may be used: (1) as part of a cell tower set of receive antennas to improve cell phone reception and location of each mobile device that is communicating with the cell tower using the angle of arrival; (2) as part of an antenna array on an aircraft to improve reception of radar and communications signals and estimate the location of the corresponding emitter; or (3) as part of a communications satellite to estimate where the ground station is in order to do a better job of beam pointing.

Algorithm 1 uses selection combining to estimate the original signal. Selection combining selects from among the received signals {$y_i(t)$} the signal that has the most power. That is, selection combining finds the index I which solves the following problem:

$$I(t) = I_T(t) = \max_i \sum_{t \in T} |y_i(t)|^2$$

Here T denotes the index of time values (for example, T={$t_1$, $t_2$, . . . , $t_N$}) within the duration of the signal or the portion of the signal that is being processed. This is typically a sliding window that extends from the present time for a fixed number of time samples in the past. Therefore, typically the T subscript is dropped and only the index I depending on time t is shown.

In order to assess the performance of selection combining for SNR improvement, a statistical simulation was produced using a Rayleigh distribution having a scale parameter σ=1. A value of K=2 was used for the channel filter length and a window length N=100 samples was used; thus assuming that the change rate in the fading was less than or equal to $f_s/100$, where $f_s$ is the receiver sample rate. A value of 6 dB was adopted for the depth of fade (how low in amplitude the indirect paths are compared to the direct paths), and hence the depth of fade parameter will be set as $F=10^{6/10}$.

Figure 2:
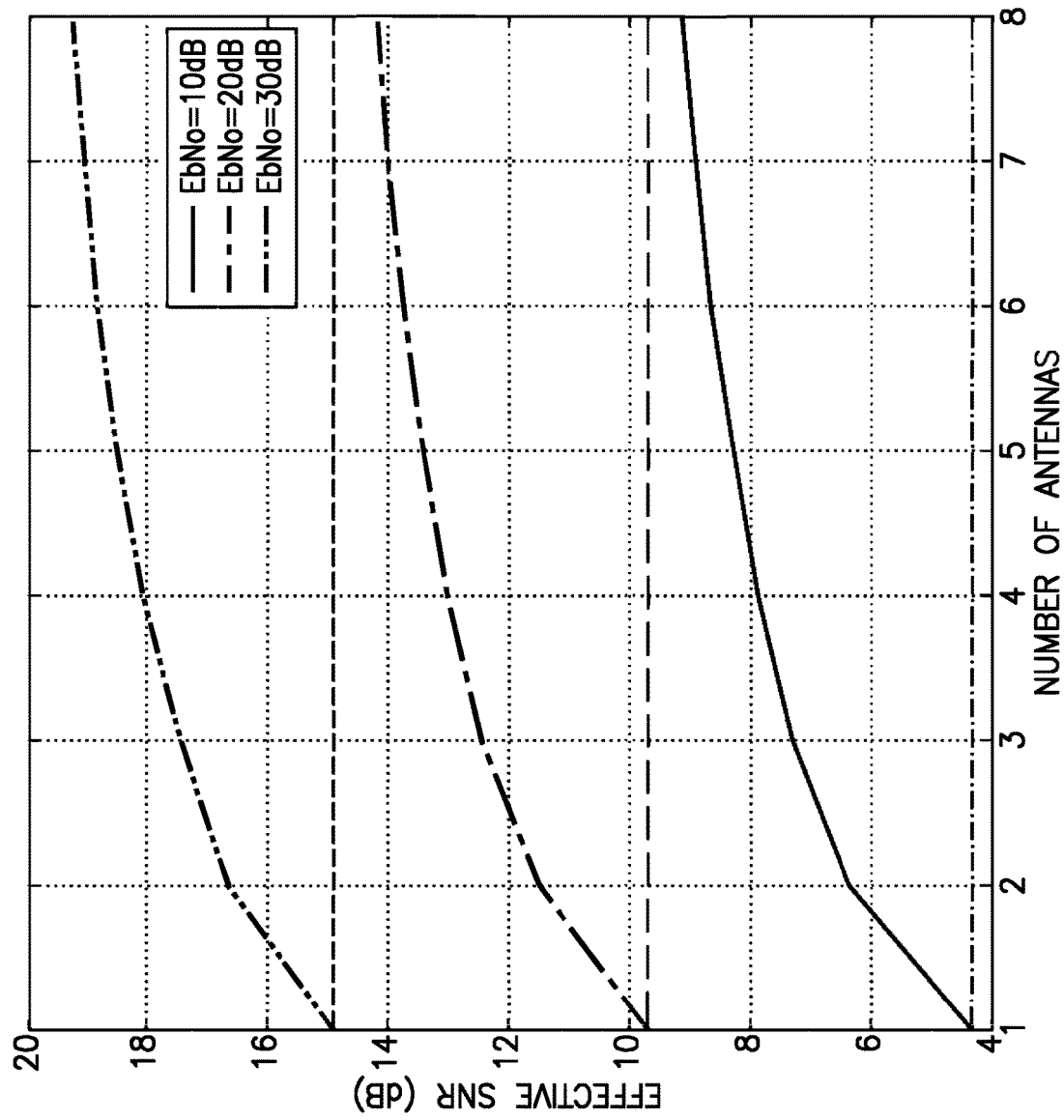
FIG. 2 is a graph showing the results of simulation of selection combining to improve SNR for three different SNR signal values [10, 20, 30] dB. The vertical axis is effective SNR (energy per bit to noise power spectral density ratio); the horizontal axis is number of antennas.

FIG. 2 is a graph showing the results of simulation of selection combining to improve SNR for three different SNR signal values [10, 20, 30] dB. The vertical axis is $E/N_0$ (energy per bit to noise power spectral density ratio); the horizontal axis is number of antennas. The parameter $E/N_0$ is a normalized SNR measure (also known as the "effective SNR") that indicates the power efficiency of a system, where $E_b$ is the signal energy associated with each user data bit (signal power divided by user bit rate), and $N_0$ is the noise spectral density (the noise power in a 1-Hz bandwidth). The ratio $E_b/N_0$ is dimensionless and expressed in decibels. The simulation results presented in FIG. 2 show that eight antennas improve the signal SNR by over 4 dB in each case, whereas eight antennas could theoretically improve SNR by over 9 dB if done optimally. Thus, selection combining has the potential to be improved upon, as will be described below (see description of Algorithm 2).

In accordance with one embodiment using Algorithm 1, the diversity processor 16 is configured to select, from among the received signals {$y_i(t)$}, the signal that has the most power using selection combining as described above. The selection combining returns the signal $S(t)=y_{I(t)}(t)$ as the best estimate of the original signal. To estimate the angle of arrival, the diversity processor processes the best estimate as shown in FIG. 3.

Figure 3:
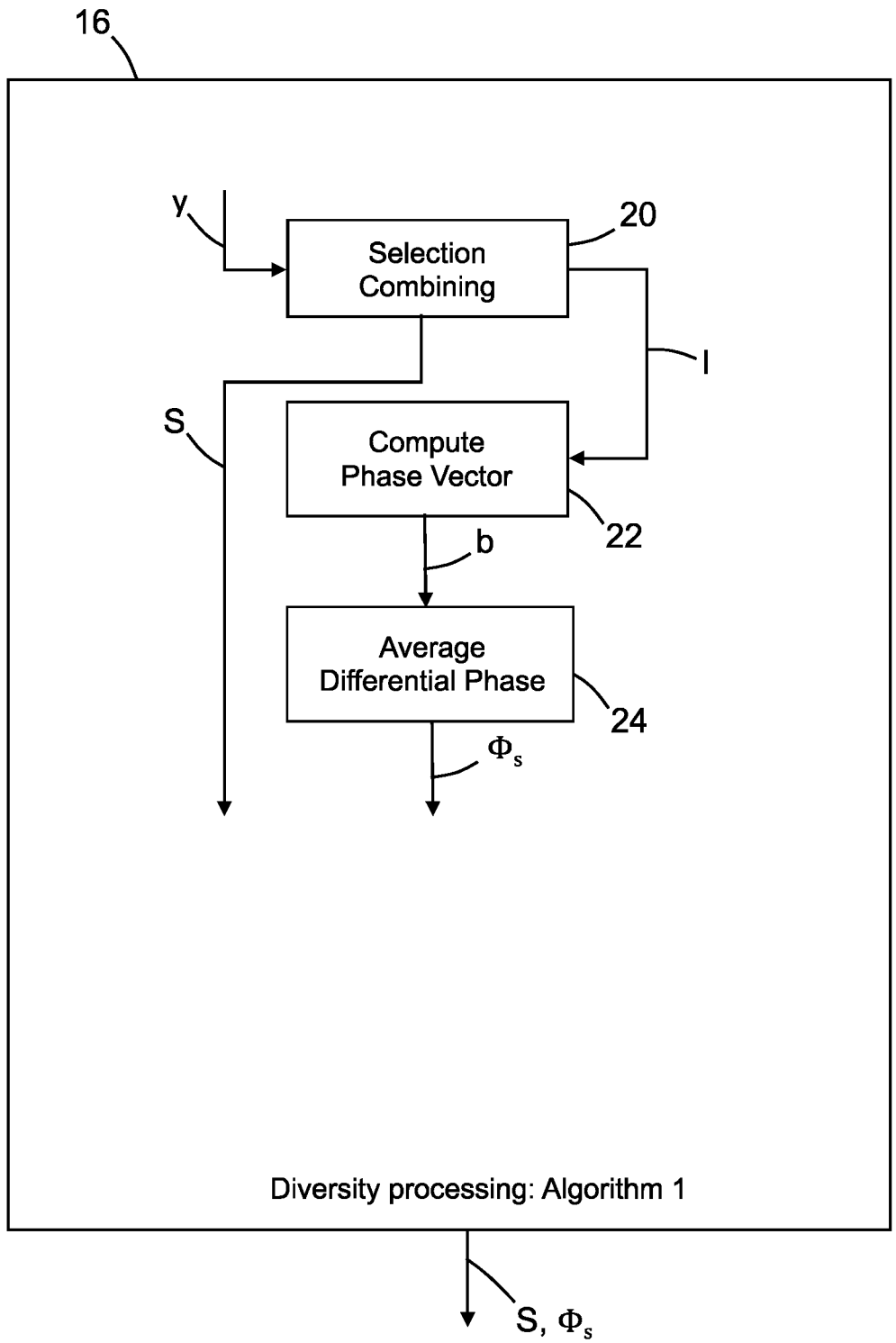
FIG. 3 is a flowchart identifying steps of a first optimization algorithm which may be used to improve angle of arrival estimation while using the standard diversity technique of selection combining to estimate the original signal.

FIG. 3 is a flowchart identifying steps of a first optimization algorithm (Algorithm 1) which may be used to improve angle of arrival estimation, while using the standard diversity technique of selection combining to estimate the original signal. Algorithm 1 consists of the following steps:

1. Use selection combining to return the signal $S(t)=y_{I(t)}(t)$ as the best estimate of the original signal (step 20 in FIG. 3).

2. Compute the vector $b(t)=[b_1(t), b_2(t), \ldots, b_R(t)]$ of phases of complex numbers (step 22 in FIG. 3) defined for i=1, 2, . . . , R:

$$b_i(t)=\text{angle}(y_i(t)/y_{I(t)}(t)).$$

The complex numbers represent the received signals; the function angle( ) returns the phase angle in the interval [−π,π] for each element of a complex array.

3. Average vector b(t) across t∈T to produce the length-R phase vector $$\Psi(t) = \text{mean}_{t \in T}(b(t))$$

and then compute the mean of the vector diff(Ψ) formed by taking R−1 consecutive differences [$\Psi_2-\Psi_1, \Psi_3-\Psi_2, \ldots, \Psi_R-\Psi_{R-1}$] of the vector Ψ(t) (step 24 in FIG. 3). This mean value is denoted by $\Phi_S(t)$. The value $\Phi_S(t)$ is the estimate of phase difference, and from that, an estimate of angle of arrival is straightforward.

Figure 4:
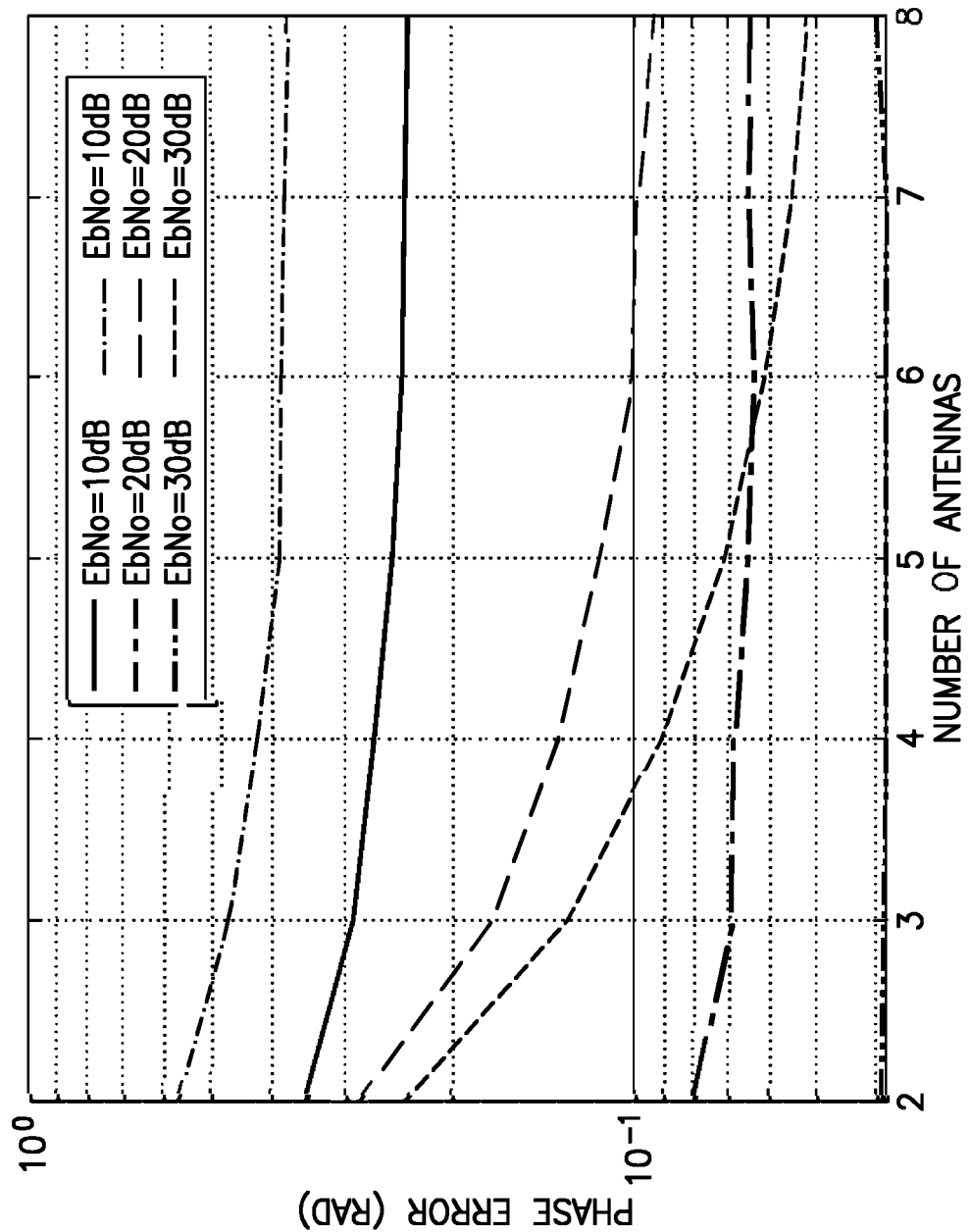
FIG. 4 is a graph showing how much the angular error (differential phase error) in radians (versus number of antennas) is improved using a first optimization algorithm for three different SNR signal values [10, 20, 30] dB. The lines which are not bold denote always using the first channel as the phase reference, whereas the bold lines denote using the channel with the most power.

FIG. 4 shows how much the angular error (differential phase error) in radians is improved using Algorithm 1 Here the non-bold lines denote always using the first channel as the phase reference versus the bold lines which use the channel with the most power. The latter has a clear advantage, especially when the number of antennas is small. However, Algorithm 1 may be improved upon by Algorithm 2, which uses selection combining and signal equalization.

Algorithm 2 addresses producing a better estimate of the incoming signal as well as the angle of arrival (using estimated phase difference), whereas Algorithm 1 simply uses the results of selection combining as the signal estimate. When multiple copies of received signals are available, channel equalization is a standard method that is often used in order to gain a better signal estimate. Channel equalization will be describe briefly before explaining the basics of signal equalization as used in Algorithm 2.

Channel equalization is the process where an estimate is made to invert the effects of the channel that distort the signal as it arrives at each antenna. When more than one antenna is involved, this process is called multi-channel equalization. Channel equalization approximates the inverse of each of the channel filters and applies these inverses to the filtered signal to get rid of the channel effects. In the case where the signal is unknown (typical for the applications under consideration here, as opposed to communications systems where known preambles are inserted into messages), this is called blind multi-channel equalization. Mathematically, the system $$y_i(t) = e^{j(i\phi(t))}s(t)*h_i(t)+n_i(t)$$

for i=1, . . . , R is adopted as set forth above. Channel equalization estimates the inverses of each channel filter and produces $\{H_i = \widehat{h_i^{-1}}\}_{i=1}^R$. Then each receive channel can be used to estimate s as in $$\widehat{s_i(t)} = y_i(t)*H_i(t) = (e^{j(i\Phi(t))}s(t))*(h_i(t)*H_i(t))+n_i(t)*H_i(t)$$

for i=1, . . . , R. Here any or all of the collection of estimates $\hat{s}_i$ of s can then be used to estimate signal s itself with an unknown phase. This process wipes out the phase delays on each antenna.

Signal equalization is a different approach than channel equalization. Signal equalization forms the basis for Algorithm 2 Algorithm 2 uses selection combining and signal equalization to produce an estimate of the received signal along with estimates of each channel (instead of their inverse as above). Then Algorithm 2 uses the channel estimates to derive a phase difference estimate that is used for angle of arrival. Algorithm 2 provides a large improvement over Algorithm 1 in terms of performance, but it is more complicated and so employs more computing resources.

Signal equalization attempts to estimate s itself, and as part of that process, signal equalization produces estimates $\{H_i\}$ of channel filters $\{h_i\}_{i=1}^R$, rather than their inverses. If one wishes to estimate N samples of the signal s, first assume that one actually had those N samples. Then form the N−K+1×K matrix (using Matlab notation)

$$A = \text{hankel}(s(:N-K+1),s(N-K+1:N)),$$

which may be expressed in matrix form as follows:

$$A = \begin{bmatrix} s_1 & s_2 & \cdots & s_K \\ s_2 & s_3 & \cdots & s_{K+1} \\ \vdots & \vdots & \vdots & \vdots \\ s_{N-K+1} & s_{N-K+2} & \cdots & s_N \end{bmatrix}$$

Now set the K×R matrix X equal to the matrix of channel filters $\{h_i\}_{i=1}^R$ as column vectors, each of length K $$X = \begin{bmatrix} h_{11} & h_{12} & \cdots & h_{1R} \\ h_{21} & h_{22} & \cdots & h_{2R} \\ \vdots & \vdots & \vdots & \vdots \\ h_{K1} & h_{K2} & \cdots & h_{KR} \end{bmatrix}$$

Finally, set the N×R matrix B equal to $$B = \begin{bmatrix} y_{11} & y_{21} & \cdots & y_{R1} \\ y_{12} & y_{22} & \cdots & y_{R2} \\ \vdots & \vdots & \vdots & \vdots \\ y_{1N} & y_{2N} & \cdots & y_{RN} \end{bmatrix}$$

Then the original equation can be written in the matrix form $$AX=B.$$

Now consider that the original signal is not actually known and the channel filters are not known either. The only variable known to the receiver is the matrix B. Algorithm 2 uses selection combining to create the first estimate of A by deriving an initial signal estimate. Then Algorithm 2 uses optimization methods to estimate the signal s and, as a by-product, the channel filters $\{h_i\}$.

The blind multi-channel signal equalization of Algorithm 2 works as follows. Using selection combining, find from among the received signals $\{y_i(t)\}$ the one that has the most power over a window T as before. That is, blind multi-channel signal equalization finds the index I which solves the problem:

$$I(t) = \max_i \sum_{t \in T} |y_i(t)|^2$$

Algorithm 2 is an iterative algorithm Iteration 0 (which is the initialization step) is described as follows. The original estimate of the signal is set to $S_0=S_0(t)=y_I(T)$ is set. Then the matrix $A_0$ is constructed as $$A_0 = \text{hankel}(S_0(1:N-K+1),S_0(N-K+1:N))$$

and solved as $$A_0 X_0 = B$$

for $X_0$ using standard matrix least squares (to be described below). Then compute the optimization metric $$v_0 = \sum_{i=1}^R MSE_i W_i$$

where MSE is a 1×R vector estimate of the mean square error of the least square estimate (described below) for each column of matrix B. Here $W_i$ is a weight vector of size R×1 which is defined as $$W_i = N/\Sigma_{t \in T} |y_i(t)|^2 \qquad (1)$$

This gives a first approximation to the channel filters $\{h_i\}_{i=1}^R$ from the columns of $X_0$. What has been described is the first iteration of Algorithm 2

Figure 5:
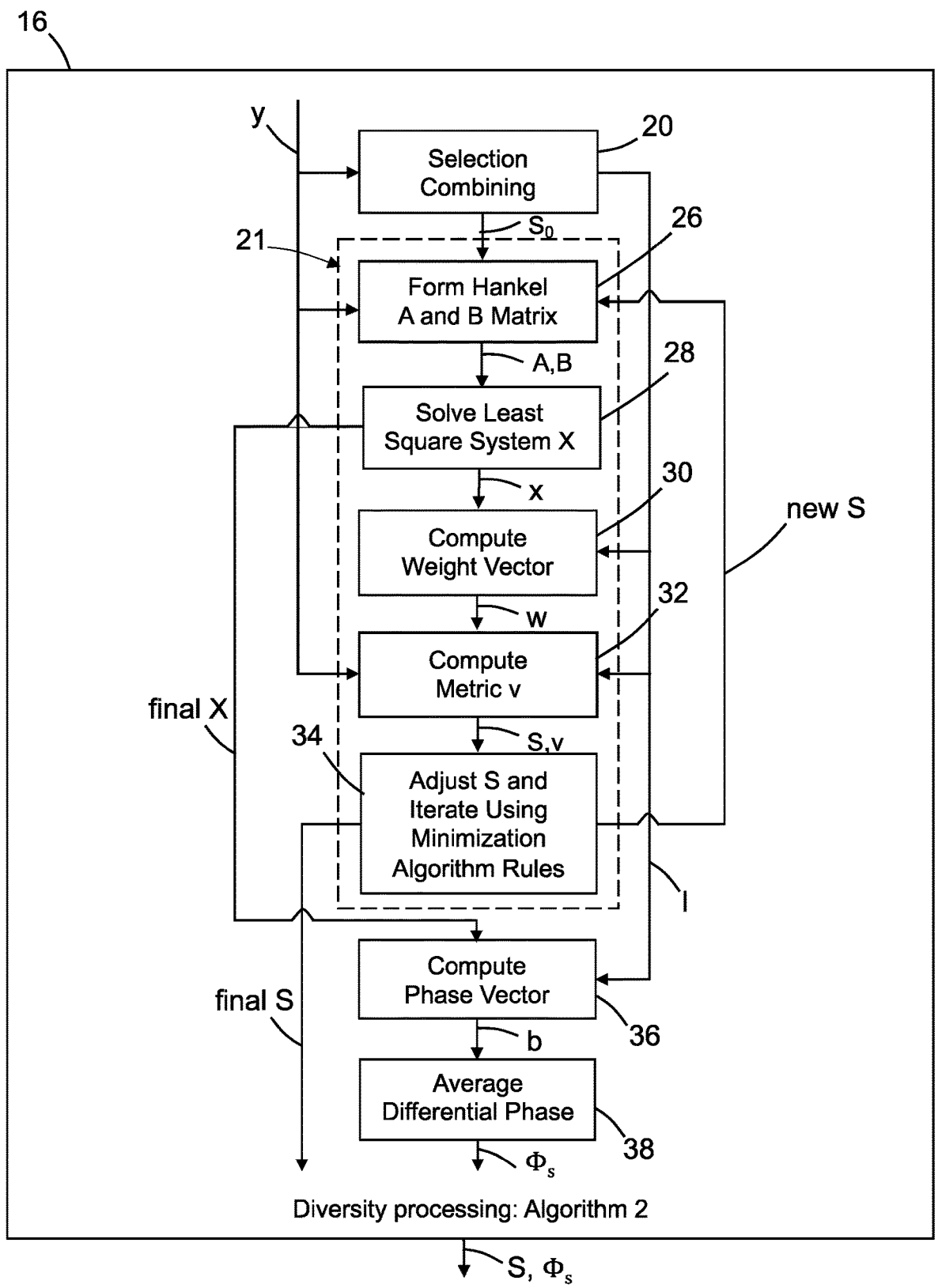
FIG. 5 is a flowchart identifying steps of a second optimization algorithm which uses signal equalization rather than channel equalization to both improve the signal SNR over standard selection combining and further improve the angle of arrival estimate over the first optimization algorithm

FIG. 5 is a flowchart identifying steps of Algorithm 2. Algorithm 2 is defined by the following steps:

(1) Compute the initial signal estimate $S_0$ using selection combining (step 20 in FIG. 5). The index I of the signal selected from selection combining is output to blocks (steps) 30, 32, and 36 described below.

(2) Using a chosen unconstrained minimization algorithm 21 (the standard Quasi-Newton method is used in the simulation results described in the next section), initialize a signal vector $z=S_0$ and solve the minimization problem $$S = \min_x f(z, y, K, W)$$

for a chosen filter length K and weight vector W. The steps of the unconstrained minimization algorithm 21 are inside the dashed rectangle seen in FIG. 5.

Here the function to be minimized is defined as follows. The function $f(z, y, K, W)$ takes as input to be optimized the initial signal vector z with parameters being the set of received signal vectors $\{y_i(t)\}$, the proposed filter length K, and the weight vector W (see Eq. (1)). Signal vector z holds the signal optimization results. Signal vector z is updated as the minimization process proceeds. The final result that is in signal vector z is the actual signal estimate S. The function $f(z, y, K, W)$ produces the metric v to be optimized using the following calculations (step 26 in FIG. 5):

$$A = \text{hankel}(z(1:N-K+1), z(N-K+1:N))$$

$$B = \begin{bmatrix} y_{11} & y_{21} & \cdots & y_{R1} \\ y_{12} & y_{22} & \cdots & y_{R2} \\ \vdots & \vdots & \vdots & \vdots \\ y_{1N} & y_{2N} & \cdots & y_{RN} \end{bmatrix}$$

Then compute the least square solution to AX=B (step 28 in FIG. 5). Next compute the weight factor W (step 30 in FIG. 5) as:

$$W_i = N/\Sigma_{t \in T} |y_i(t)|^2$$

and compute the metric v (step 32 in FIG. 5) defined as $$v = \Sigma_{i=1}^R MSE_i W_i.$$

Then the signal estimate S is adjusted using rules of the minimization algorithm (step 34 in FIG. 5). The process then returns to step 26, which computes Hankel matrix A and matrix B using the new estimate for S.

The minimization algorithm adjusts the value of signal vector z and recomputes metric $f(z, y, K, W)$ until its value is minimized. Then the optimal value z is returned and this is set to the final (optimal) signal estimate S.

To estimate the phase difference that gives the angle of arrival, take the optimal signal estimate S and compute its Hankel matrix A (step 26 in FIG. 5). Then the least square estimate of $A_S X_S = B$ produces the matrix $X_S$ with columns as $X_S = [H_1, H_2, \ldots, H_R]$ (step 28 in FIG. 5). Here each column vector is of length K with elements $\{H_{i,k}\}$ for $k=1, 2, \ldots, K$. These elements represent the channel filter estimates. To estimate the angle of arrival (i.e., differential phase estimate), Algorithm 2 performs the following additional steps:

(3) Compute the vector of phases (step 36 in FIG. 5) of the leading filter coefficients defined (using Matlab notation for the index) for $i=1, 2, \ldots, R$:

$$b_i = \text{angle}(H_{i,1}/H_{I,1})$$

(4) Average across T to produce phase vector $\Psi(t) = \text{mean}_T(b(t))$ and then compute the mean of the vector $\text{diff}(\Psi)$ formed by taking R−1 consecutive differences of the length-R phase vector $\Psi(t)$ (step 38 in FIG. 5). This mean value is denoted by $\Phi_S(t)$. The value $\Phi_S(t)$ is the estimate of phase difference, and from that, an estimate of angle of arrival is straightforward.

Figure 6:
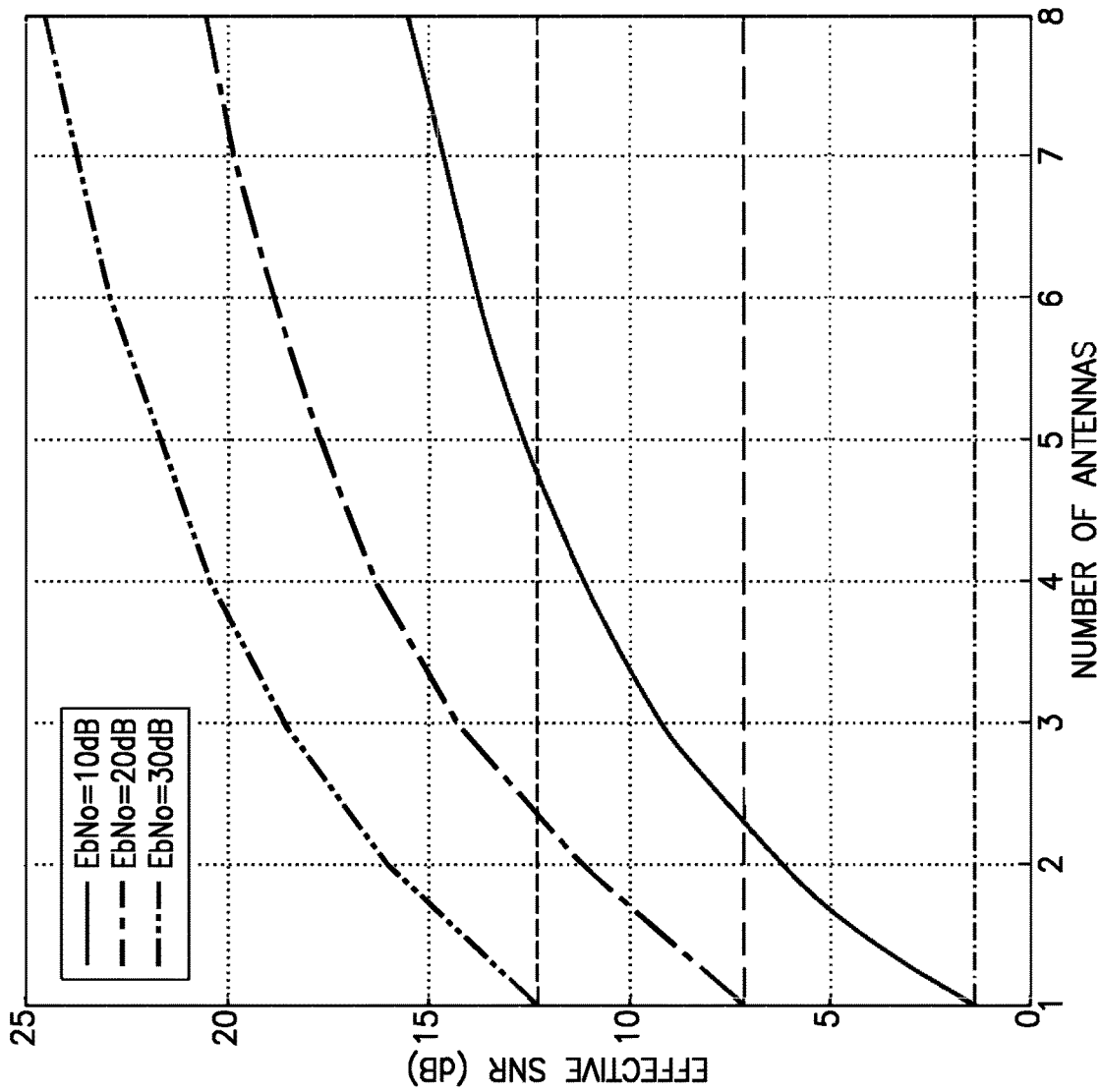
FIG. 6 is a graph showing the results of simulation of the second optimization algorithm to improve SNR for three different SNR signal values [10, 20, 30] dB. The vertical axis is effective SNR (energy per bit to noise power spectral density ratio); the horizontal axis is number of antennas.

In order to assess the performance of Algorithm 2 for SNR improvement, a statistical simulation was produced. A value of K=2 was used for the channel filter length and a window length N=100 samples was used; thus assuming that the change rate in the fading was less than or equal to $f_s/100$, where $f_s$ is the receiver sample rate. A value of 6 dB was adopted for the depth of fade (how low in amplitude the indirect paths are compared to the direct paths) and hence $F=10^{6/10}$. FIG. 6 shows the improvement in signal SNR for three different SNR signal values [10, 20, 30] dB and the number of antennas varying from one to eight.

Table 1 shows the improvement provided by Algorithm 2 in comparison to Algorithm 1.

TABLE 1

| No. of Antennas | SNR (dB) | Algorithm 1 | Algorithm 2 | Improvement (dB) |
|---|---|---|---|---|
| 4 | 30 | 18 | 21 | 3 |
| 6 | 30 | 18.8 | 23 | 4.2 |
| 8 | 30 | 19.2 | 24 | 4.8 |
| 4 | 20 | 13 | 17 | 4 |
| 6 | 20 | 13.6 | 18.5 | 4.9 |
| 8 | 20 | 14.1 | 20.5 | 6.4 |
| 4 | 10 | 7.8 | 12 | 4.2 |
| 6 | 10 | 8.7 | 13.5 | 4.8 |
| 8 | 10 | 9.1 | 15.5 | 6.4 |

Figure 7:
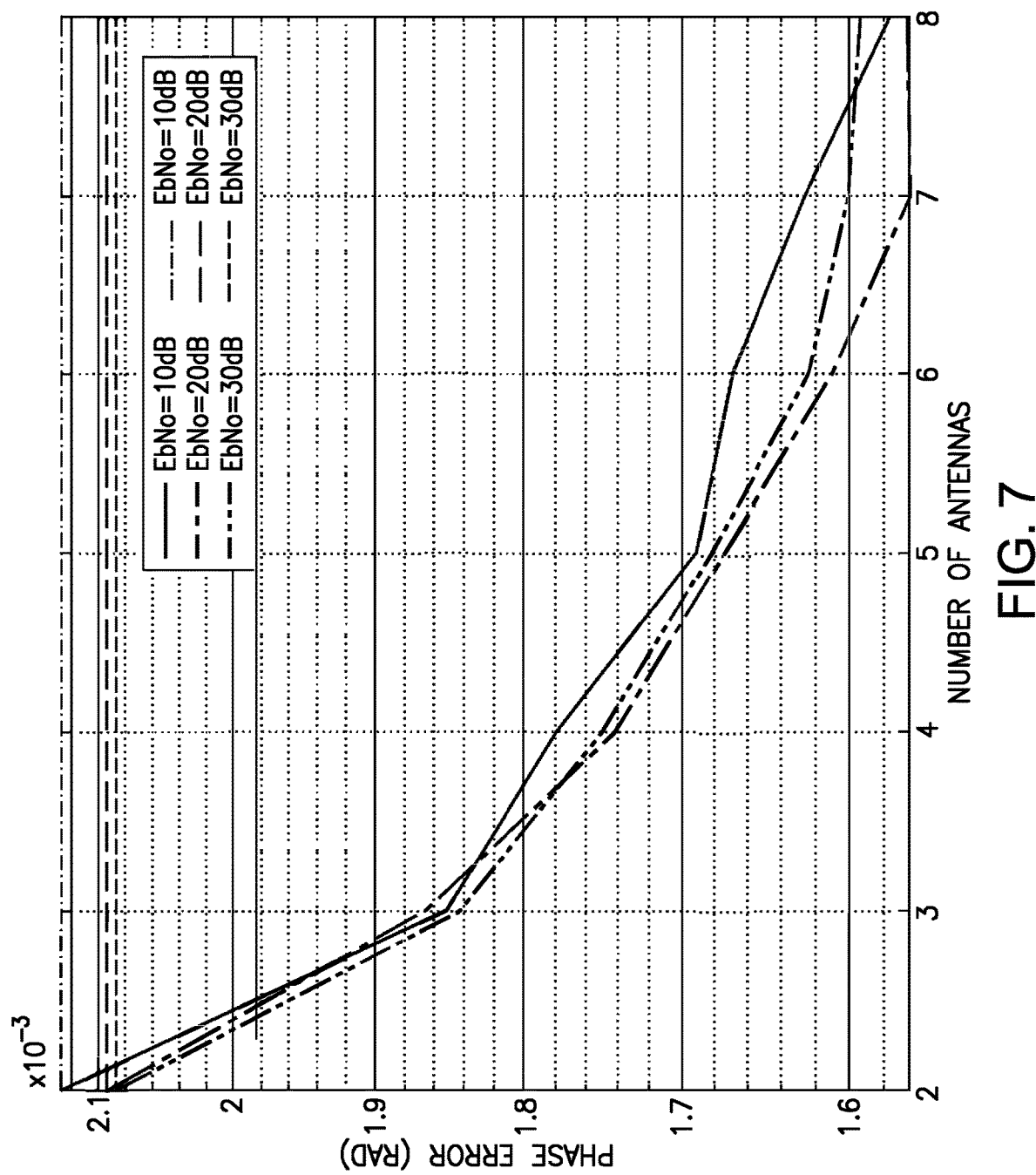
FIG. 7 is a graph showing how much the angular error (differential phase error) in radians (versus number of antennas) is improved using the second optimization algorithm for three different SNR signal values [10, 20, 30] dB.

In addition, the differential phase estimate was implemented using Algorithm 2, and a statistical simulation was produced. FIG. 7 shows the improvement in differential phase error for three different SNR signal values [10, 20, 30] dB and the number of antennas varying from one to eight. Clearly, the improvement in phase error (and hence angle of arrival error) due to Algorithm 2 is more than an order of magnitude compared to Algorithm 1. The error is also less dependent on the SNR of the signal than was Algorithm 1

For completeness, the standard complex weighted least squares method will now be described for solving the standard matrix estimation problem:

$$AX_i = B_i$$

where X is an n×k matrix, A is an m×n matrix, and B is an m×k matrix. The least square solution for X minimizes the sum of squared errors $$(B_i - AX_i)^T (B_i - AX_i)$$

where $(\ )^T$ denotes complex conjugate transposition. In cases where the m×m covariance matrix $V_i$ of this linear system is known, the more general weighted least square solution that minimizes $$(B_i - AX_i)^T V_i^{-1} (B_i - AX_i)$$

can be found using least squares. The full rank standard closed-form solution is described in Strang, G., Introduction to Applied Mathematics, Wellesley-Cambridge, 1986, p. 398. The mean squared error is given by $$MSE_i = B_i^T(V_i^{-1} - V_i^{-1}A(A^TV_i^{-1}A)^{-1}A^TV_i^{-1})B_i/(N-R)$$

Here each entry of the MSE is an estimate of $\delta^2$ if the covariance of $B_i$ is $\delta^2 V_i$. An estimated covariance matrix of X is given by the k×k matrix S where $$S_i = (A^TV^{-1}A)^{-1}MSE_i.$$

Finally, the standard deviation estimate of each i-th column of X is given by stdX and is formed from the diagonal elements of S as $$stdX_i = \sqrt{diag(S_i)}.$$

There are standard computational methods when the above closed-form solutions cannot be used directly (for example, if matrices have reduced rank).

In summary, the technology proposed herein has the following features: (1) receiver diversity is applied to wideband signal separation and processing while preserving angle of arrival information; and (2) signal equalization using optimization techniques increases signal fidelity over traditional selection combining, enables more precise estimation of angle of arrival, and improves signal separation and tracking receiver applications. These features provide benefits, including better detection, tracking, and characterization of weak and distant signals. In the context of signal separation, these techniques can improve signal fidelity beyond simple diversity methods and standard selection combining While methods for improving multiple signal reception using receiver diversity have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

In the method claims appended hereto, any alphabetic ordering of steps is for the sole purpose of enabling subsequent short-hand references to antecedent steps and not for the purpose of limiting the scope of the claim to require that the method steps be performed in alphabetic order.

The invention claimed is:

1. A method for multiple signal reception using receiver diversity, the method comprising:
    (a) receiving respective received signals in a plurality of receivers following transmission of an original signal by a source;
    (b) calculating an estimate of the original signal using selection combining of the received signals; and
    (c) calculating an estimate of an angle of arrival of the original signal using the estimate of the original signal, wherein step (c) comprises:
    (d) computing phase vectors representing phases of the received signals at respective times; and
    (e) computing an average of consecutive phase differences of the received signals.

2. The method as recited in claim 1, wherein step (b) comprises selecting a received signal that has the most power.

3. The method as recited in claim 1, wherein step (e) comprises:
    computing an average of the phase vectors over time for the signals received by each receiver; and
    computing an average of consecutive phase differences of the respective average phase vectors.

4. The method as recited in claim 1, wherein the estimate of the angle of arrival calculated in step (c) is used to locate the source.

5. A system for multiple signal reception using receiver diversity, the system comprising:
    a plurality of antennas configured to transduce an original signal transmitted as radiation by a source into analog electrical signals;
    a plurality of receivers respectively connected to receive analog electrical signals from the plurality of antennas and configured to convert the analog electrical signals to digital electrical signals; and
    a diversity processor connected to receive digital electrical signals from the plurality of receivers and configured to perform operations comprising:
    (a) calculating an estimate of an original signal using selection combining of the digital electrical signals; and
    (b) calculating an estimate of an angle of arrival of the original signal using the estimate of the original signal, wherein operation (b) comprises:
    (c) computing phase vectors representing phases of the received signals at respective times; and
    (d) computing an average of consecutive phase differences of the received signals.

6. The system as recited in claim 5, wherein operation (a) comprises selecting a received signal that has the most power.

7. The system as recited in claim 5, wherein step (d) comprises:
    computing an average of the phase vectors over time for the signals received by each receiver; and
    computing an average of consecutive phase differences of the respective average phase vectors.

8. A method for multiple signal reception using receiver diversity, the method comprising:
    (a) receiving respective received signals in a plurality of receivers following transmission of an original signal by a source;
    (b) calculating an initial estimate of the original signal using selection combining of the received signals; and
    (c) calculating an optimized estimate of the original signal using rules of a minimization algorithm and the initial estimate of the original signal,
    wherein step (c) comprises adjusting successive estimates of the original signal using the rules of the minimization algorithm.

9. A method for multiple signal reception using receiver diversity, the method comprising:
    (a) receiving respective received signals in a plurality of receivers following transmission of an original signal by a source;
    (b) calculating an initial estimate of the original signal using selection combining of the received signals; and
    (c) calculating an optimized estimate of the original signal using rules of a minimization algorithm and the initial estimate of the original signal,
    wherein step (c) comprises minimizing a function $f(z, y, K, W)$, and the function $f(z, y, K, W)$ takes as input to be optimized an initial signal vector z with parameters being a set of received signal vectors $\{y_i(t)\}$, a proposed filter length K, and a weight vector W.

10. A method for multiple signal reception using receiver diversity, the method comprising:
(a) receiving respective received signals in a plurality of receivers following transmission of an original signal by a source;
(b) calculating an initial estimate of the original signal using selection combining of the received signals;
(c) calculating an optimized estimate of the original signal using rules of a minimization algorithm and the initial estimate of the original signal; and
(d) calculating an estimate of an angle of arrival of the original signal using the optimized estimate of the original signal.

11. The method as recited in claim 10, wherein step (d) comprises:
calculating estimates of optimal channel filter coefficients using the optimized estimate of the original signal;
computing phase vectors representing phases of the optimal channel filter coefficients; and
computing an average of consecutive phase differences of the optimal channel filter coefficients.

12. The method as recited in claim 10, wherein the estimate of the angle of arrival calculated in step (d) is used to locate the source.

13. A system for multiple signal reception using receiver diversity, the system comprising:
a plurality of antennas configured to transduce an original signal transmitted as radiation by a source into analog electrical signals;
a plurality of receivers respectively connected to receive analog electrical signals from the plurality of antennas and configured to convert the analog electrical signals to digital electrical signals; and
a diversity processor connected to receive digital electrical signals from the plurality of receivers and configured to perform operations comprising:
(a) calculating an initial estimate of the original signal using selection combining of the received signals; and
(b) calculating an optimized estimate of the original signal using rules of a minimization algorithm and the initial estimate of the original signal,
wherein operation (b) comprises adjusting successive estimates of the original signal using the rules of the minimization algorithm.

14. A system for multiple signal reception using receiver diversity, the system comprising:
a plurality of antennas configured to transduce an original signal transmitted as radiation by a source into analog electrical signals;
a plurality of receivers respectively connected to receive analog electrical signals from the plurality of antennas and configured to convert the analog electrical signals to digital electrical signals; and
a diversity processor connected to receive digital electrical signals from the plurality of receivers and configured to perform operations comprising:
(a) calculating an initial estimate of the original signal using selection combining of the received signals; and
(b) calculating an optimized estimate of the original signal using rules of a minimization algorithm and the initial estimate of the original signal,
wherein operation (b) comprises minimizing a function $f(z, y, K, W)$, and the function $f(z, y, K, W)$ takes as input to be optimized an initial signal vector z with parameters being a set of received signal vectors $\{y_i(t)\}$, a proposed filter length K, and a weight vector W.

15. A system for multiple signal reception using receiver diversity, the system comprising:
a plurality of antennas configured to transduce an original signal transmitted as radiation by a source into analog electrical signals;
a plurality of receivers respectively connected to receive analog electrical signals from the plurality of antennas and configured to convert the analog electrical signals to digital electrical signals; and
a diversity processor connected to receive digital electrical signals from the plurality of receivers and configured to perform operations comprising:
(a) calculating an initial estimate of the original signal using selection combining of the received signals; and
(b) calculating an optimized estimate of the original signal using rules of a minimization algorithm and the initial estimate of the original signal; and
(c) calculating an estimate of an angle of arrival of the original signal using the optimized estimate of the original signal.

16. The system as recited in claim 15, wherein operation (c) comprises:
calculating estimates of optimal channel filter coefficients using the optimized estimate of the original signal;
computing phase vectors representing phases of the optimal channel filter coefficients; and
computing an average of consecutive phase differences of the optimal channel filter coefficients.

17. The method as recited in claim 9, wherein the signal vector z holds signal optimization results and is updated as the minimization algorithm proceeds.

18. The system as recited in claim 14, wherein the signal vector z holds signal optimization results and is updated as the minimization algorithm proceeds.

19. The system as recited in claim 15, wherein operation (a) comprises selecting a received signal that has the most power.

* * * * *